US008216722B2

(12) United States Patent
Gordon

(10) Patent No.: US 8,216,722 B2
(45) Date of Patent: Jul. 10, 2012

(54) SOLID ELECTROLYTE FOR ALKALI-METAL-ION BATTERIES

(75) Inventor: John Howard Gordon, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 478 days.

(21) Appl. No.: 12/323,165

(22) Filed: Nov. 25, 2008

(65) Prior Publication Data

US 2009/0136830 A1 May 28, 2009

Related U.S. Application Data

(60) Provisional application No. 60/990,556, filed on Nov. 27, 2007.

(51) Int. Cl.
*H01M 6/18* (2006.01)
*H01M 6/04* (2006.01)

(52) U.S. Cl. ........................... 429/317; 429/188

(58) Field of Classification Search .................. 429/188, 429/317
See application file for complete search history.

(56) References Cited

U.S. PATENT DOCUMENTS

| 1,501,756 | A | 7/1924 | Downs |
|---|---|---|---|
| 3,660,170 | A | 5/1972 | Rampel |
| 3,785,965 | A | 1/1974 | Welty |
| 3,787,315 | A | 1/1974 | Bearden, Jr. et al. |
| 3,788,978 | A | 1/1974 | Bearden, Jr. et al. |
| 3,791,966 | A | 2/1974 | Bearden |
| 3,970,472 | A | 7/1976 | Steffensen |
| 4,053,371 | A | 10/1977 | Towsley et al. |
| 4,076,613 | A | 2/1978 | Bearden, Jr. |
| 4,207,391 | A | 6/1980 | Church et al. |
| 4,298,666 | A | 11/1981 | Taskier |
| 4,307,164 | A | 12/1981 | Church et al. |
| 4,372,823 | A | 2/1983 | Church et al. |
| 4,465,744 | A | 8/1984 | Susman et al. |
| 4,479,856 | A | 10/1984 | Ando |
| 4,542,444 | A | 9/1985 | Boland |
| 4,546,055 | A | 10/1985 | Coetzer et al. |
| 4,623,597 | A | 11/1986 | Sapru et al. |
| 4,842,963 | A | 6/1989 | Ross, Jr. |

(Continued)

FOREIGN PATENT DOCUMENTS

JP 08321322 A 12/1996

(Continued)

OTHER PUBLICATIONS

Wang, et al., "Li1.3Al0.3Ti1.7(PO4)3 Filler Effect on (PEO)LiClO4 Solid Polymer Electrode", Journal of Polymer Science Part B: Polymer Physics 43: 743-751, 2005.*

(Continued)

*Primary Examiner* — Karie O'Neill Apicella
(74) *Attorney, Agent, or Firm* — David Fonda

(57) ABSTRACT

An alkali-metal-ion battery is disclosed in one embodiment of the invention as including an anode containing an alkali metal, a cathode, and an electrolyte separator for conducting alkali metal ions between the anode and the cathode. In selected embodiments, the electrolyte separator includes a first phase comprising poly(alkylene oxide) and an alkali-metal salt in a molar ratio of less than 10:1. The electrolyte separator may further include a second phase comprising ionically conductive particles that are conductive to the alkali metal ions. These ionically conductive particles may include ionically conductive ceramic particles, glass particles, glass-ceramic particles, or mixtures thereof.

14 Claims, 3 Drawing Sheets

U.S. PATENT DOCUMENTS

| | | | |
|---|---|---|---|
| 5,057,206 A | 10/1991 | Engel et al. |
| 5,213,908 A | 5/1993 | Hagedorn |
| 5,290,405 A | 3/1994 | Joshi et al. |
| 5,342,709 A | 8/1994 | Yahnke et al. |
| 5,516,598 A | 5/1996 | Visco et al. |
| 5,525,442 A | 6/1996 | Shuster |
| 5,541,019 A | 7/1996 | Anani et al. |
| 5,580,430 A | 12/1996 | Balagopal et al. |
| 5,695,632 A | 12/1997 | Brons et al. |
| 5,780,186 A | 7/1998 | Casey, Jr. |
| 5,856,047 A | 1/1999 | Venkatesan et al. |
| 5,882,812 A | 3/1999 | Visco et al. |
| 5,935,421 A | 8/1999 | Brons et al. |
| 6,017,651 A | 1/2000 | Nimon et al. |
| 6,025,094 A | 2/2000 | Visco et al. |
| 6,030,720 A | 2/2000 | Chu et al. |
| 6,110,236 A | 8/2000 | Tsang et al. |
| 6,153,328 A | 11/2000 | Colborn |
| 6,159,634 A | 12/2000 | Yen et al. |
| 6,165,644 A | 12/2000 | Nimon et al. |
| 6,200,704 B1 | 3/2001 | Katz et al. |
| 6,210,564 B1 | 4/2001 | Brons et al. |
| 6,210,832 B1 | 4/2001 | Visco et al. |
| 6,214,061 B1 | 4/2001 | Visco et al. |
| 6,225,002 B1 | 5/2001 | Nimon et al. |
| 6,248,476 B1 | 6/2001 | Sun et al. |
| 6,248,481 B1 | 6/2001 | Visco et al. |
| 6,265,100 B1 | 7/2001 | Saaski et al. |
| 6,291,090 B1 | 9/2001 | Kuznetsov et al. |
| 6,310,960 B1 | 10/2001 | Saaski et al. |
| 6,355,379 B1 * | 3/2002 | Ohshita et al. ............ 429/304 |
| 6,358,643 B1 | 3/2002 | Katz et al. |
| 6,368,486 B1 | 4/2002 | Thompson et al. |
| 6,376,123 B1 | 4/2002 | Chu |
| 6,402,795 B1 | 6/2002 | Chu et al. |
| 6,413,284 B1 | 7/2002 | Chu et al. |
| 6,413,285 B1 | 7/2002 | Chu et al. |
| 6,416,903 B1 | 7/2002 | Fierro et al. |
| 6,432,584 B1 | 8/2002 | Visco et al. |
| 6,537,701 B1 | 3/2003 | Nimon et al. |
| 6,610,440 B1 | 8/2003 | LaFollette et al. |
| 6,632,573 B1 | 10/2003 | Nimon et al. |
| 6,737,197 B2 | 5/2004 | Chu et al. |
| 6,787,019 B2 | 9/2004 | Jacobson et al. |
| 6,852,450 B2 | 2/2005 | Hwang et al. |
| 6,881,234 B2 | 4/2005 | Towsley |
| 6,911,280 B1 | 6/2005 | De Jonghe et al. |
| 6,955,753 B1 | 10/2005 | Gomez |
| 6,955,866 B2 | 10/2005 | Nimon et al. |
| 6,991,662 B2 | 1/2006 | Visco et al. |
| 7,070,632 B1 | 7/2006 | Visco et al. |
| 7,144,654 B2 | 12/2006 | LaFollette et al. |
| 7,166,384 B2 | 1/2007 | LaFollette et al. |
| 7,214,443 B2 | 5/2007 | Clarke et al. |
| 7,259,126 B2 | 8/2007 | Gordon et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,390,591 B2 | 6/2008 | Visco et al. |
| 7,432,017 B2 | 10/2008 | Visco et al. |
| 7,482,096 B2 | 1/2009 | De Jonghe et al. |
| 7,491,458 B2 | 2/2009 | Visco et al. |
| 2002/0150818 A1 | 10/2002 | Amatucci et al. |
| 2004/0197641 A1 | 10/2004 | Visco et al. |
| 2004/0229107 A1 | 11/2004 | Smedley |
| 2005/0109617 A1 | 5/2005 | Ono et al. |
| 2005/0175894 A1 | 8/2005 | Visco et al. |
| 2006/0096893 A1 | 5/2006 | De Almeida et al. |
| 2006/0141346 A1 | 6/2006 | Gordon et al. |
| 2006/0177732 A1 | 8/2006 | Visco et al. |
| 2006/0257734 A1 | 11/2006 | Obata et al. |
| 2007/0048610 A1 | 3/2007 | Tsang |
| 2007/0172739 A1 | 7/2007 | Visco et al. |
| 2007/0221265 A1 | 9/2007 | Affinito et al. |
| 2007/0259235 A1 | 11/2007 | Jacobson et al. |
| 2008/0268327 A1 | 10/2008 | Gordon et al. |
| 2009/0061288 A1 | 3/2009 | Gordon et al. |
| 2009/0134842 A1 | 5/2009 | Joshi et al. |
| 2009/0136830 A1 | 5/2009 | Gordon |
| 2010/0285372 A1 | 11/2010 | Lee et al. |

FOREIGN PATENT DOCUMENTS

| | | |
|---|---|---|
| WO | WO2005038953 | 4/2005 |

OTHER PUBLICATIONS

Goodenough, J.B. et al., "Fast Na+ -Ion Transport in Skeleton Structures", *Mat. Res. Bull.*, vol. 11, Pergamon Press, Inc. Printed in the United States, (1976),203-220.

Hong, H.Y-P. et al., "Crystal Structures and Crystal Chemistry in the System Na1+xZr2SixP3-xO12", *Mat. Res. Bull.*, vol. 11, 1976. Pergamon Press, Inc. Printed in the United States.,(1976),173-186.

Bentzen, J. J., et al., "The preparation and characterization of dense, highly conductive Na5GdSi4O12 nasicon (NGS)", *Materials Research Bulletin*, vol. 15,(1980),1737-1745.

Delmas, C. et al., "Crystal chemistry of the Na1+xZr2-xLx(PO4)3 (L = Cr, In, Yb) solid solutions", *Materials Research Bulletin*, vol. 16,(1981),285-290.

Von Alpen, V. et al., "Compositional dependence of the electrochemical and structural parameters in the NASICON system (Na1+xSixZr2P3-xO12)", *Solid State Ionics*, vol. 3/4,(1981),215-218.

Fujitsu, S. et al., "Conduction paths in sintered ionic conductive material Na1+xYxZr2-x(PO4)3", *Materials Research Bulletin*, vol. 16,(1981),1299-1309.

Saito, Y. et al., "Ionic Conductivity of NASICON-type conductors Na1.5M0.5Zr1.5(PO4)3 (M: Al3+, Ga3+, Cr3+, Sc3+, Fe3+, In3+, Yb3+, Y3+)", *Solid State Ionics*, vol. 58,(1992),327-331.

Alamo, J. "Chemistry and properties of solids with the [NZP] skeleton", *Solid State Ionics*, vol. 63-65,(1993),547-561.

Shimazu, K. et al., "Electrical conductivity and Ti4+ ion substitution range in NASICON system", *Solid State Ionics*, vol. 79, (1995),106-110.

Miyajima, Y. et al., "Ionic conductivity of NASICON-type Na1+xMxZr2-xP3O12(M: Yb, Er, Dy)", *Solid State Ionics*, vol. 84,(1996),61-64.

Manickam, Minakshi et al., "Lithium insertion into manganese dioxide electrode in MnO2/Zn aqueous battery Part I. A preliminary study", *Journal of Power Sources*, vol. 130, Issues 1-2 (Obtained through ScienceDirect),(May 2004),254-259.

Kim, "International Search Report", International App. No. PCT/US2008/084707, (Apr. 29, 2009),1-3.

Kim, "Written Opinion of the International Searching Authority", International.App. No. PCT/US2008/084707, (Apr. 29, 2009),1-4

Park, Jin "Written Opinion of the International Searching Authority Mailed On Jun. 30, 2009", Int. App. No. PCT/US2008/084572, 1-3

Park, Jin "International Search Report Mailed on Jun. 30, 2009", Int. App. No. PCT/US2008/084572, 1-3.

Kim, Jun Hak "Written Opinion of the International Searching Authority Mailed on Aug. 24, 2009", Int. App. No. PCT/US2009/032458, 1-4.

Kim, Jun Hak "International Search Report Mailed on Aug. 24, 2009", Int, App. No.PCT/US2009/032458, 1-3.

Sumathipala, et al., "Novel Li+ Ion Conductors and Mixed Conductors, Li3+xSixCr1-xO4 and a Simple Method for Estimating Li+/e-Transport Numbers", *J. Electrochem. Soc.*, vol. 142, No. 7,(Jul. 1995),2138-2143.

Kowalczk, et al., "Li-air batteries: A classic example of limitations owing to solubilities", *Pure Appl. Chem.*, vol. 79, No. 5,(2007),851-860.

Read, "Characterization of the Lithium/Oxygen Organic Electrolyte Battery", *J. Electrochem. Soc.*, vol. 149, No. 9,(2002),A1190-A1195.

Panero, et al., "High Voltage Lithium Polymer Cells Using a PAN-Based Composite Electrolyte", *J. Electrochem. Soc.*, vol. 149, No. 4,(2002),A414-A417.

Dissanayake, et al., "Lithium ion conducting Li4-2xGe1-xSxO4 solid electrolytes", *Solid State Ionics*, 62,(1993),217-223.

Balagopal, et al., "Selective sodium removal from aqueous waste streams with NaSICON ceramics", *Separation and Purification Technology*, 15,(1999),231-237.

Sagane, et al., "Li+ and Na+ transfer through interfaces between inorganic solid electrolytes and polymer or liquid electrolytes", *Journal of Power Sources*, 146,(2005),749-752.

Wang, et al., "LiTi2(PO4)3 with NASICON-type structure as lithium-storage materials", *Journal of Power Sources*, 124,(2003),231-236.

Dissanayake, et al., "New solid electrolytes and mixed conductors: Li3+xCr1-xMxO4: M = Ge, Ti", *Solid State Ionics*, 76,(1995),215-220.

Kerr, "Polymeric Electrolytes: An Overview", *Lithium Batteries: Science and Technology*, Chapter 19, edited by Nazri and Pistoia, Kluwer Academic Publishers,(2004),574-622.

Young, Lee W., "International Search Report", *PCT Search Report* for App. No. PCT/US 07/21978, (Oct. 10, 2008),1-2.

Young, Lee W., "Written Opinion of the International Searching Authority", *PCT Written Opinion* for App. No. PCT/US 07/21978, (Oct. 10, 2008),1-5.

Young, Lee W., "International Search Report", *PCT Search Report* for App. No. PCT/US 08/10435, (Nov. 25, 2008),1-2.

Young, Lee W., "Written Opinion of the International Searching Authority", *PCT Written Opinion* for App. No. PCT/US 08/10435, (Nov. 25, 2008),1-4.

Fu, "Effects of M3+ Ions on the Conductivity of Glasses and Glass-ceramics in the system Li2O-M2O3-GeO2-P2O5 (M = Al, Ga, Y, Dt, Gd, and La)", *Communications of the American Ceramic Society*, vol. 83, No. 4, (Apr. 2000),104-106.

Thokchom, et al., "Superionic Conductivity in a Lithium Aluminum Germanium Phosphate Glass-Ceramic", *Journal of the Electrochemical Society*, 155 (12), (Oct. 8, 2008),A915-A920.

Fu, "Fast Li+ Ion Conducting Glass Ceramics in the System Li2O-Al2O3-TiO2-P2O5", *Science Direct, Solid State Ionics*, vol. 104, Issues 3-4, (Dec. 11, 1997),191-194.

Saienga, et al., "The Comparative Structure, Property, and Ionic Conductivity of LiI + Li2S + GeS2 Glasses Doped with Ga2S3 and La2S3", *Journal of Non-Crystalline Solids*, vol. 354, 14, (Mar. 1, 2008),Abstract.

Wang, et al., "Polymer Composite Electrolytes Containing Active Mesoporous SiO2 Particles", *Journal of Applied Physics*, 102, (2007),1-6.

Wang, et al., "Li1.3Al0.3Ti1.7(PO4)3 Filler Effect on (PEO)LiClO4 Solid Polymer Electrode", *Department of Materials Science and Engineering, Zhejiang University*, (2004),Abstract.

Armand, Michel et al., "ionic-liquid materials for the electrochemical challenges of the future", *Nature Materials*, (Jul. 24, 2009),621-629.

Cantelmo, Gregg "Office Action for U.S Appl. No. 11/944,719", (Dec. 27, 2010),1-8.

Cullen, Sean P., "Office Action for U.S Appl. No. 12/205,759", (Apr. 13, 2011),1-15.

Cullen, Sean P., "Office Action for U.S Appl. No. 12/205,759", (Sep. 16, 2010),1-22.

Doyle, Kevin P., et al., "Dentrite-Free Electrochemical Deposition of Li-Na Alloys from an Ionic Liquid Electrolyte", *Journal of the Electrochemical Society*, (May 2006),A1353-A1357.

IPDL Machine Translation of JP08-321322A, 1-10.

Kalafut, Stephen J., "Office Action for U.S Appl. No. 11/871,824", (Dec. 10, 2010),1-7.

Kalafut, Stephen J., "Office Action for U.S Appl. No. 11/871,824", (May 25, 2010),1-8.

Kim, K et al., "Electrochemical Investigation of Quaternary Ammonium/Aluminum Chloride Ionic Liquids", *Journal of the Electrochemical Society*, (Jun. 2004),A1168-A1172.

Kim, Ketack et al., "The Role of Additives in the Electroreduction of Sodium Ions in Chloroaluminate-Based Ionic Liquids", *Journal of The Electrochemical Society*, (Dec. 2004),E9-E13.

Kim, Yeon-Gyeong "PCT International Search Report", Int. App. No. PCT/US2009/056781, (Mar. 2, 2010),1-4.

Kim, Yeon-Gyeong "PCT Written Opinion", Int. App. No. PCT/US2009/056781, (Mar. 2, 2010),1-3.

Lang, Christopher M., et al., "Cation Electrochemical Stability in Chloroaluminate Ionic Liquids", *J. Phys. Chem.*, (2005),19454-19462.

Parsons, Thomas H., "Office Action for U.S. Appl. No. 12/022,381", (May 24, 2011),1-11.

Salminen, Justin et al., "Ionic liquids for rechargeable lithium batteries", *Lawrence Berkeley National Laboratory*, (Sep. 21),1-19.

Wu, Xian Ming et al., "Preparation and characterization of lithium-ion-conductive Li(1.3)Al(0.3)Tl(1.7)(PO4)3 thin films by the solution deposition", *Thin Solid Films* 425, (2003),103-107.

Lee, Kang Young "International Search Report", International App. No. PCT/US2010/055718, (Jun. 21, 2011),1-3.

Lee, Kang Young "Written Opinion", International App. No. PCT/US2010/055718, (Jun. 21, 2011),1-3.

\* cited by examiner

SOLID ELECTROLYTE FOR ALKALI-METAL-ION BATTERIES

RELATED APPLICATIONS

This application claims priority to U.S. Provisional Patent No. 60/990,556 filed on Nov. 27, 2007 and entitled SOLID LITHIUM ION CONDUCTIVE ELECTROLYTE BATTERY.

BACKGROUND

1. Field of the Invention

This invention relates to batteries and more particularly to substantially solid electrolytes for alkali-metal-ion batteries.

2. Description of the Related Art

Our society has come to rely on batteries to power a myriad of devices, including computers, cell phones, portable music players, lighting devices, as well as many other electronic components. Nevertheless, there is an ongoing need for further advances in battery technology. For example, there is still a significant need for economical batteries that can power automobiles or provide load-leveling capabilities for wind, solar, or other energy technologies. Furthermore, the "information age" increasingly demands portable energy sources that provide lighter weight, higher energy, longer discharge times, more "cycles", and smaller customized designs. To achieve these advances, technologists continue to work to develop batteries with higher and higher energy densities while still providing acceptable safety, power densities, cost, and other needed characteristics.

Lithium-ion batteries have the potential to meet many of the above-stated needs. Lithium-ion batteries have a higher energy density than most other types of rechargeable batteries. They also operate at higher voltages than other rechargeable batteries—typically about 3.7 volts for lithium-ion compared to approximately 1.2 volts for nickel cadmium (NiCd) or nickel metal hydride (NiMH) batteries. This allows fewer cells to be used for a given application. Lithium-ion batteries also have a lower self-discharge rate than other types of rechargeable batteries—typically half that of nickel-based batteries. Lithium-ion batteries also exhibit good cycle life and have lower toxicity compared to other rechargeable systems.

Nevertheless, current lithium-ion batteries also have various limitations. For example, safety is a major issue as various lithium-ion chemistries maybe subject to thermal run-away and explosion. One of the primary reasons behind the hazard is the use of flammable organic solvents within typical lithium-ion batteries. Previous efforts to develop solid lithium-ion-conductive electrolytes have been largely unsatisfactory due to low conductivity. Other known solid electrolytes are unsatisfactory because of unacceptable physical characteristics. For example, lithium aluminum titanium phosphate (LATP), a lithium-ion-conductive ceramic, has good conductivity but by itself cannot be used as a separator because it is undesirably brittle and inflexible. Cracks or breakdown of the electrolyte separator may cause a catastrophic failure of the battery.

In view of the foregoing, what is needed is a robust, substantially solid electrolyte separator that can be used to reduce thermal run-away and flammability in alkali-metal-ion batteries. Ideally, such an electrolyte separator will be flexible, maintain its structural integrity even when very thin, and exhibit good ionic conductivity. Such an electrolyte separator may be used to produce a substantially solid state alkali-metal-ion (e.g., lithium-ion) battery, but may also be used advantageously in other types of batteries.

SUMMARY

The invention has been developed in response to the present state of the art and, in particular, in response to the problems and needs in the art that have not yet been fully solved by currently available alkali-metal-ion batteries. Accordingly, the invention has been developed to provide systems and methods to improve the performance of alkali-metal-ion batteries. The features and advantages of the invention will become more fully apparent from the following description and appended claims, or may be learned by practice of the invention as set forth hereinafter.

Consistent with the foregoing and in accordance with the invention as embodied and broadly described herein, an alkali-metal-ion battery (e.g., a lithium-ion-battery) is disclosed in one embodiment of the invention as including an anode containing an alkali metal (e.g., lithium), a cathode, and an electrolyte separator for conducting alkali metal ions between the anode and the cathode. In selected embodiments, the electrolyte separator includes a first phase comprising poly(alkylene oxide) and an alkali-metal salt (e.g., a lithium salt) in a molar ratio of less than 10:1. The electrolyte separator may further include a second phase comprising ionically conductive particles that are conductive to the alkali metal ions. These ionically conductive particles may include ionically conductive ceramic particles, glass particles, glass-ceramic particles, or mixtures thereof.

In certain embodiments, the electrolyte separator may further include a third phase comprising porous particles infiltrated with an organic solvent, such as ethylene carbonate, propylene carbonate, diethyl carbonate, tetraglyme, or mixtures thereof. An alkali-metal salt (e.g., a lithium salt) may be dissolved in the organic solvent to provide ionic conductivity. As will be explained in more detail hereafter, the porous particles may significantly increase the ionic conductivity of the electrolyte separator.

In selected embodiments, the molar ratio between the poly (alkylene oxide) and the alkali-metal salt is about 8:1. Similarly, in selected embodiments, the weight ratio of the ionically conductive particles to the poly(alkylene oxide) exceeds 20:80. In other embodiments, the weight ratio of the ionically conductive particles to the poly(alkylene oxide) exceeds 50:50. In certain embodiments, the ionically conductive particles may include ceramic particles such as particles of lithium aluminum titanium phosphate (LATP).

In another embodiment, a method in accordance with the invention may include generating alkali-metal ions at an anode containing an alkali metal. These ions may be conducted through a substantially nonporous electrolyte separator. The electrolyte separator may include a first phase comprising poly(alkylene oxide) (such as poly(ethylene oxide), poly(propylene oxide), or copolymers of ethylene oxide and propylene oxide) and an alkali-metal salt in a molar ratio of less than 10:1. The electrolyte separator may further include a second phase comprising ionically conductive particles that are conductive to the alkali metal ions. The ionically conductive particles may include ceramic particles, glass particles, glass-ceramic particles, or combinations thereof. The method may then include reacting the alkali-metal ions at a cathode.

In yet another embodiment of the invention, an alkali-metal-ion battery in accordance with the invention may include an anode containing an alkali metal, a cathode, and an electrolyte separator for conducting alkali metal ions between the anode and the cathode. The electrolyte separator may include a first phase comprising poly(ethylene oxide) and an alkali-metal salt in a molar ratio of about 8:1, and a second phase comprising ionically conductive particles that are conductive to the alkali metal ions. The ionically conductive particles may include ceramic particles, glass particles, glass-ceramic particles, or combinations thereof. The electrolyte separator may further include a third phase comprising porous particles infiltrated with an organic solvent.

The present invention provides an improved alkali-metal-ion battery that overcomes various limitations of conventional alkali-metal-ion batteries. The features and advantages of the present invention will become more fully apparent from the following description and appended claims, or may be learned by practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
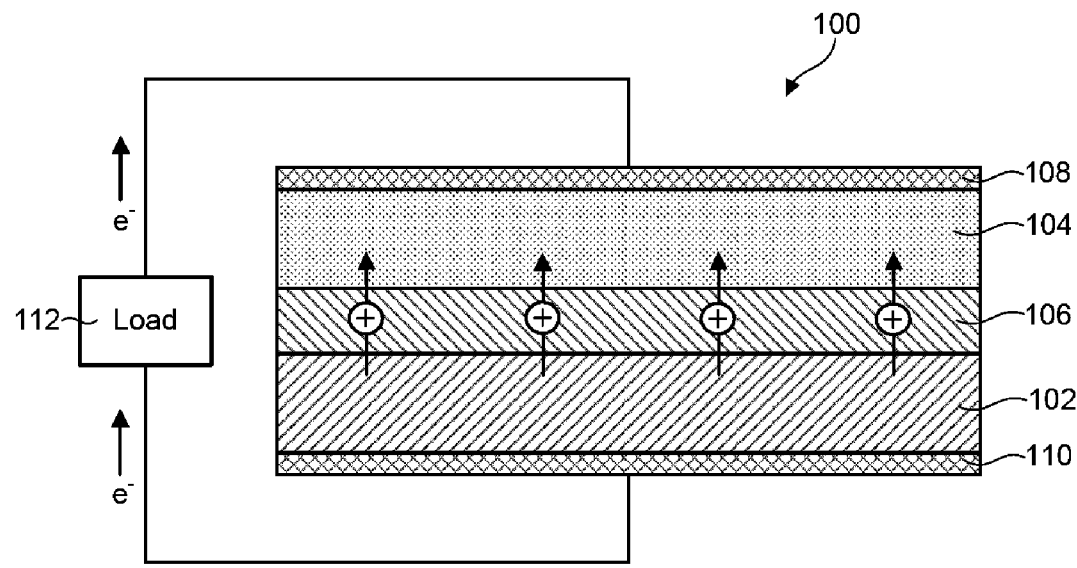
FIG. 1 is a high-level block diagram of one embodiment of an alkali-metal-ion battery under load.
Figure 2:
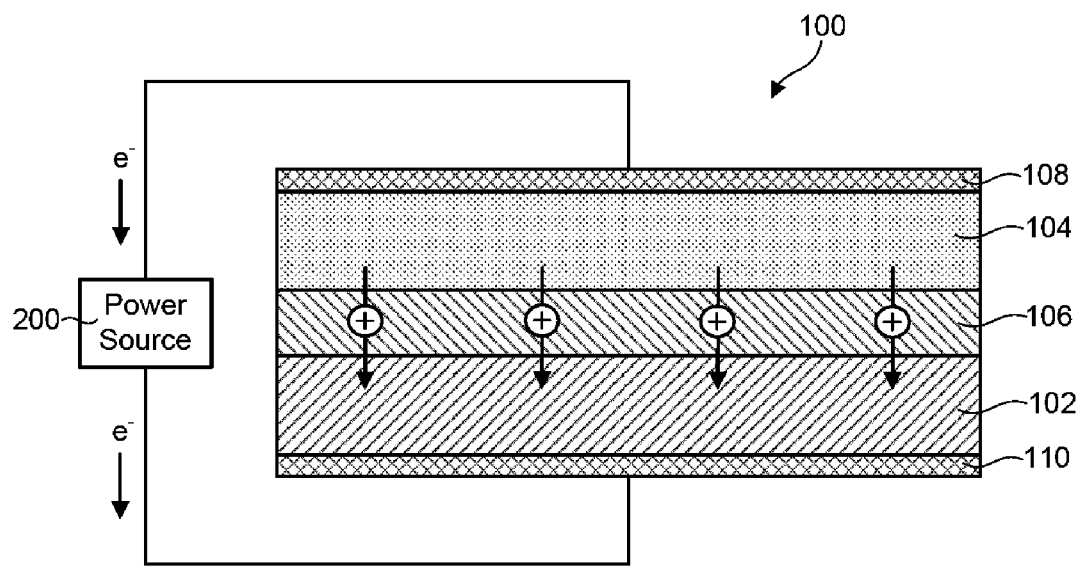
FIG. 2 is a high-level block diagram of one embodiment of an alkali-metal-ion battery during recharge.

Referring to FIGS. 1 and 2, one embodiment of an alkali-metal-ion battery 100 under load and during recharge is illustrated. In general, an alkali-metal-ion battery 100 in accordance with the invention may include an alkali-metal-containing anode 102, a cathode 104, and a substantially non-porous, solid-state, alkali-metal-ion-conductive electrolyte separator 106. As will be explained in more detail hereafter, the solid-state electrolyte separator 106 may significantly improve battery safety by replacing conventional liquid electrolytes (and their problems with thermal run-away and explosion). Current collectors 108, 110, such as metal screens or meshes, may be placed in contact with or be embedded within the anode 102 and cathode 104, respectively, to conduct electrical current to and from the anode 102 and cathode 104.

Referring to FIG. 1, upon discharging the battery 100, the alkali metal may be oxidized at the anode 102 to produce alkali-metal ions and electrons. The electrons may be conducted through a load 112 and the alkali-metal ions may be conducted through the electrolyte separator 106 to the cathode 104. At the cathode 104, the alkali-metal ions may react with cathode constituents.

Referring to FIG. 2, upon charging, a power source 200 may cause the cathode constituents to react to produce alkali-metal ions and electrons. The electrons may be conducted through the power source 200 and the alkali-metal ions may be conducted through the separator 106 to the anode 102. At the anode 102, the alkali-metal ions may react with electrons to generate the alkali metal or some other alkali-metal-containing composition.

In certain embodiments, the alkali-metal-containing anode 102 may include an alkali metal (e.g., lithium, sodium, etc.), a carbon matrix containing an alkali metal, or other alkali-metal-containing materials or compositions. The cathode 104 may include various different materials or compositions. For example, where the alkali-metal-ion battery 100 is a lithium-ion battery 100, the cathode 104 may include materials such as $LiCoO_2$, $LiMnO_2$, $LiFePO_4$, $Li_2FePO_4F$, or the like. The foregoing represent just a few examples of possible anode and cathode materials are not intended to be limiting.

As previously mentioned, the alkali-metal-ion battery 100 may include a substantially non-porous, solid-state, electrolyte separator 106 that is conductive to alkali-metal ions to improve battery safety and provide other advantages. Ideally, the electrolyte separator 106 will be nonflammable or have reduced flammability, have good conductivity, and be flexible enough to resist shock without breaking. The flexibility will ideally allow the electrolyte separator 106 to be made very thin, in some embodiments less than 100 microns and in other embodiments less than 50 microns. This will reduce the resistance and weight of the electrolyte separator 106, increasing the battery's power and energy density. Furthermore, the non-porosity of the electrolyte separator 106 will ideally prevent dendritic shorts (shorts occurring when thin needle-like lithium crystals form upon recharge to penetrate the electrolyte separator 106). Yet another advantage of the non-porous separator 106 is that it may prevent constituents from migrating between the anode 102 and cathode 104, causing cycle fade or other undesired consequences.

To provide the advantages listed above, in selected embodiments, the electrolyte separator 106 may include several phases intermixed with one another, with each phase having different properties. For example, the electrolyte separator 106 may include a first phase containing poly(alkylene oxide) and an alkali-metal salt (e.g., a lithium salt) in a molar ratio of less than 10:1. In certain embodiments, the poly(alkylene oxide) includes poly(ethylene oxide), poly(propylene oxide), or copolymers of ethylene oxide and propylene oxide. Similarly, where the battery 100 is a lithium-ion battery 100, the alkali-metal salt may be a lithium salt such as lithium perchlorate ($LiClO_4$).

The poly(alkylene oxide) provides desired flexibility but, by itself, is not an alkali-metal-ion conductor. However, the poly(alkylene oxide) may become conductive by combining it with an alkali-metal salt, although it may still be a relatively poor alkali-metal-ion conductor (having a conductivity of around $10^{-7}$ S/cm in the case of poly(ethylene oxide) combined with lithium perchlorate in a molar ratio of about 8:1). In selected embodiments, the molar ratio of the poly(alkylene oxide) to the alkali-metal salt may be less than 10:1. In other embodiments, the molar ratio of the poly(alkylene oxide) to the alkali-metal salt may be about 8:1. For example, where the poly(alkylene oxide) is poly(ethylene oxide) and the alkali-metal salt is lithium perchlorate, optimal lithium-ion conductivity may be achieved with a molar ratio of about 8:1.

To improve the conductivity of the electrolyte separator 106, a second phase may be intermixed with or be provided as filler for the first phase. In selected embodiments, the second phase may include ionically conductive particles that are more conductive to the alkali-metal ions. For example, the ionically conductive particles may include ionically conductive ceramic particles, glass particles, glass-ceramic particles, or mixtures thereof. Ionically conductive ceramic particles, for example, may include particles of lithium aluminum titanium phosphate (e.g., $Li_{1.3}Al_{0.3}Ti_{1.7}(PO_4)_3$). This material, although too brittle and inflexible to be used as a solid-state electrolyte separator 106 by itself, when fabricated thin has good lithium-ion conductivity of around $10^{-3}$ S/cm and may be used to significantly increase the overall conductivity of the electrolyte separator 106. Currently, various non-porous ceramic glasses have also been reported to have conductivities on the order of $10^{-2}$ S/cm and thus may also be candidate materials to include in the second phase. An example of a porous glass ceramic with very high lithium ion conductivity is lithium aluminum germanium phosphate (e.g., $Li_{1.5}Al_{0.5}Ge_{1.5}(PO_4)_3$).

Other ionically conductive materials that may be included in the second phase may include, for example, materials disclosed in the following articles: "Effects of $M^{3+}$ Ions on the Conductivity of Glasses and Glass-ceramics in the system $Li_2O-M_2O_3$—$GeO_2$—$P_2O_5$ (M=Al, Ga, Y, Dy, Gd, and La)" authored by Jie Fu; "Composite Effect in Superionically Conducting Lithium Aluminium Germanium Phosphate based Glass Ceramic" authored by Joykumar S. Thokchom et al.; "Superionic Conductivity of Glass-Ceramics in the System $Li_2O$—$Al_2O_3$—$TiO_2$—$P_2O_5$" authored by Jie Fu; and "The Comparative Structure, Properties, and Ionic Conductivity of $LiI+Li_2S+GeS_2$ Glasses Doped with $Ga_2S_3$ and $La_2S_3$". Each of these articles discloses various ceramics, glasses, or glass-ceramics that are conductive to alkali-metal ions.

In certain embodiments, a third phase may be also be added to the electrolyte separator 106 as filler to further improve its conductivity. The third phase may include porous particles that are infiltrated with an organic solvent, such as ethylene carbonate, propylene carbonate, diethyl carbonate, tetraglyme, and mixtures thereof. Prior to infiltration, an alkali-metal salt (e.g., a lithium salt) may be dissolved in the organic solvent to make the organic solvent conductive to alkali-metal ions. Since the pores are very small, the amount of solvent contained within the pores is also very small—on the order of less than 2 percent of the weight of the porous particle and almost always less than 10 percent of the weight of the porous particle.

In one embodiment, the porous particles include any of various materials known as molecular sieves. A molecular sieve is generally a material with very small pores of precise and uniform size that may be used as an adsorbent for various gases and liquids. These pores may be infiltrated with the organic solvent(s) previously described. In other embodiments, the porous particles may include "active" mesoporous silica materials such as SBA-15. Such a material, for example, is described in the article: "Polymer Composite Electrolytes Containing Ionically Active Mesoporous $SiO_2$ Particles" authored by Xiao-Liang Wang et al. Another example of porous particles that may perform a similar function include mesoporous silica materials referred to as MCM-41. Each of these porous particles as well as the solvents and alkali-metal salts contained therein are provided by way of example and are not intended to be limiting.

The solid-state electrolyte separator 106 disclosed herein may be used with various different types of alkali-metal-ion batteries or battery chemistries. For example, the separator 106 may be used in an entirely or substantially solid state alkali-metal-ion battery 100, such as a solid-state lithium-ion battery 100. In such an embodiment, the anode 102, cathode 104, and electrolyte separator 106 may be fabricated from solid-state or substantially solid state materials. Such a battery 100 would likely be much safer than conventional alkali-metal-ion batteries because much if not all of the flammable solvents would be eliminated. In such embodiments, the materials used in the electrolyte separator 106 could be blended or interspersed with the materials of the cathode 104 to provide ionic conductivity through the cathode 104.

In another embodiment, the solid-state electrolyte separator 106 may be used with a battery using one or more solvents in the anode 102 or cathode 104, such as a lithium-sulfur battery 100. For example, a lithium-sulfur battery 100 may include a cathode 104 that contains elemental sulfur (typically $S_8$ molecules in solid form) and $Li_2S_x$ (lithium monosulfide and/or polysulfide), and one or more solvents (e.g., tetraglyme (TG), tetrahydrafuran (THF), and/or dimethylanaline (DMA)) selected to at least partially dissolve the elemental sulfur and the $Li_2S_x$. The solvents may increase the mobility of the elemental sulfur and the $Li_2S_x$ and help them participate more fully in the cathode reaction. These liquid solvents may also significantly improve cathode utilization. In certain embodiments, an electronic conductor such as Super P carbon may be added to the solvents to improve the electrical conductivity of the solvent mixture.

In such a battery 100, the solid-state electrolyte separator 106 may prevent cathode constituents from migrating through the separator 106 to the anode 102. This may reduce capacity fade on cycling and self-discharge. The solid-state electrolyte separator 106 may also allow the cathode solvent mixture to be optimized to best dissolve the cathode constituents and the cathode constituents to be optimized for better rate capability and/or specific capacity. For example, by using a solid-state electrolyte separator 106, a viscous solvent or binder such as polyvinyl acetate (PVA) may become unnecessary in the cathode 104. Furthermore, by using a solid-state electrolyte separator 106, a solvent and electrolyte salt that is better suited for anode cycling performance may be used in the anode 102. The solid-state electrolyte separator 106 may also provide a mechanical barrier to the formation of alkali-metal dendrites (thin metallic crystals forming on the anode 102). Thus, a solid-state electrolyte separator 106 in accordance with the invention may be used advantageously with both solid-state and/or solvent-containing alkali-metal-battery systems.

Figure 3:
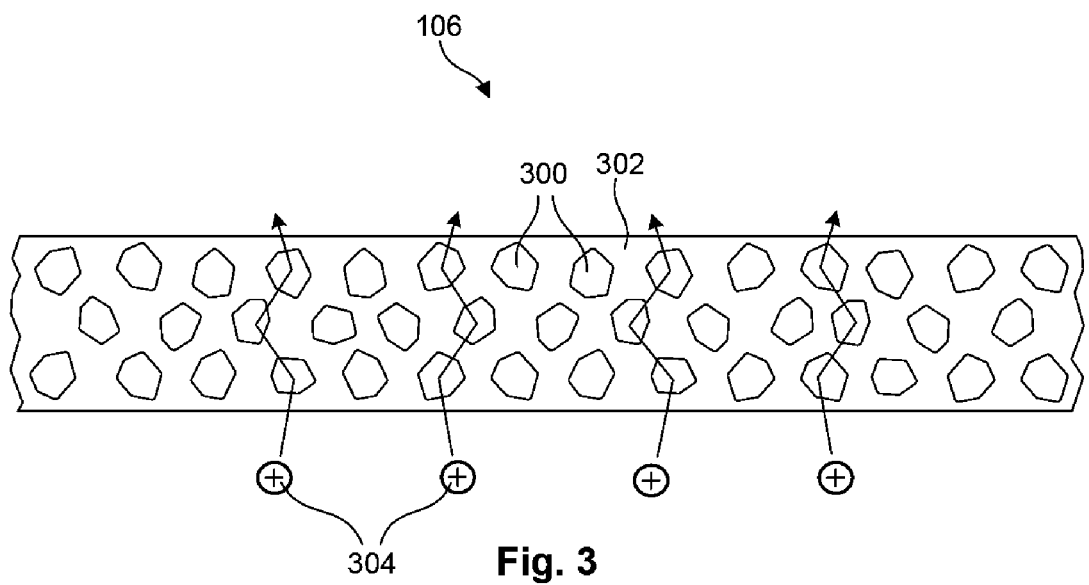
FIG. 3 is a cross-sectional cutaway view of one embodiment of a substantially solid-state electrolyte separator in accordance with the invention.

Referring to FIG. 3, a diagram of one embodiment of a substantially solid-state electrolyte separator 106 in accordance with the invention is illustrated. The electrolyte separator 106 may include: (1) a first phase containing poly(alkylene oxide) and an alkali-metal salt (e.g., a lithium salt) in a molar ratio of less than 10:1; (2) a second phase (i.e., a filler material) comprising ionically conductive particles such as ceramic, glass, or ceramic-glass particles; and optionally (3) a third phase (i.e., a filler material) comprising porous particles infiltrated with an organic solvent and an alkali-metal salt.

The illustrated electrolyte separator 106 shows the second phase 300, namely the ionically conductive particles 300, interspersed throughout the first phase 302. The third phase (i.e., the porous particles) is not shown in this diagram but may also be interspersed with the first phase 302. The first phase 302 provides flexibility to the electrolyte separator 106 and allows the separator 106 to be made very thin (e.g., on the order of 25-100 microns). This decreases the weight and resistance of the separator 106, which may increase the power and energy density of the battery 100.

When ions 304 are conducted through the separator 106, the ions may follow a path that passes through both the first phase 302 and the second phase 300, with the second phase 300 having a significantly higher ionic conductivity than the first phase 302. The ions 304 may follow a path (as indicated by the arrows) through the more conductive second phase 300 in some areas, but also through the less conductive first phase 302 in other areas. The ions 304 may tend to follow the path of least resistance, through the more conductive second phase 300.

It is important to note that when adding the second phase 300 to the first phase 302, it is important to keep the molar ratio of the first phase 302 (i.e., the molar ratio of the poly (alkylene oxide) to the alkali-metal salt) to less than 10:1, and more ideally at about 8:1. This will ensure that the ionic conductivity of the first phase 302 is maintained at an optimal level. In other words, attempts to improve conductivity by introducing ionically conductive particles 300 into the first phase 302 should not be accompanied by corresponding reductions in the ratio of the alkali-metal salt to the poly (alkylene oxide). Applicants have discovered that this technique results in sub-optimal conductivity. For example, where the ionically conductive particles 300 are LATP particles and the first phase is poly(ethylene oxide) with a lithium perchlorate salt, prior art literature reports that optimal conductivity is achieved when the weight ratio of LATP to poly (ethylene oxide) is about 15:85. Applicants have discovered that this is sub-optimal because the prior art literature reduces the amount of lithium perchlorate in the poly(ethylene oxide) while increasing the amount of LATP. Such a sub-optimal result was illustrated in "$Li_{1.3}Al_{0.3}Ti_{1.7}(PO_4)_3$ Filler Effect on (PEO)LiClO$_4$ Solid Polymer Electrolyte" authored by Yan-Jie Wang et al. Applicants submit that varying the alkali-metal salt and the ionically conductive particles independently would likely result in different optimum compositions and conductivities.

Applicants have discovered that much higher conductivities may be achieved be increasing the amount of LATP in the poly(ethylene oxide), while keeping the molar ratio of poly (ethylene oxide) to lithium perchlorate at an optimal level—specifically less then 10:1 and closer to around 8:1. In selected embodiments, the weight ratio of LATP to poly (ethylene oxide) may be greater than 20:80 and in other embodiments greater than 50:50 to achieve optimal ionic conductivity.

Figure 4:
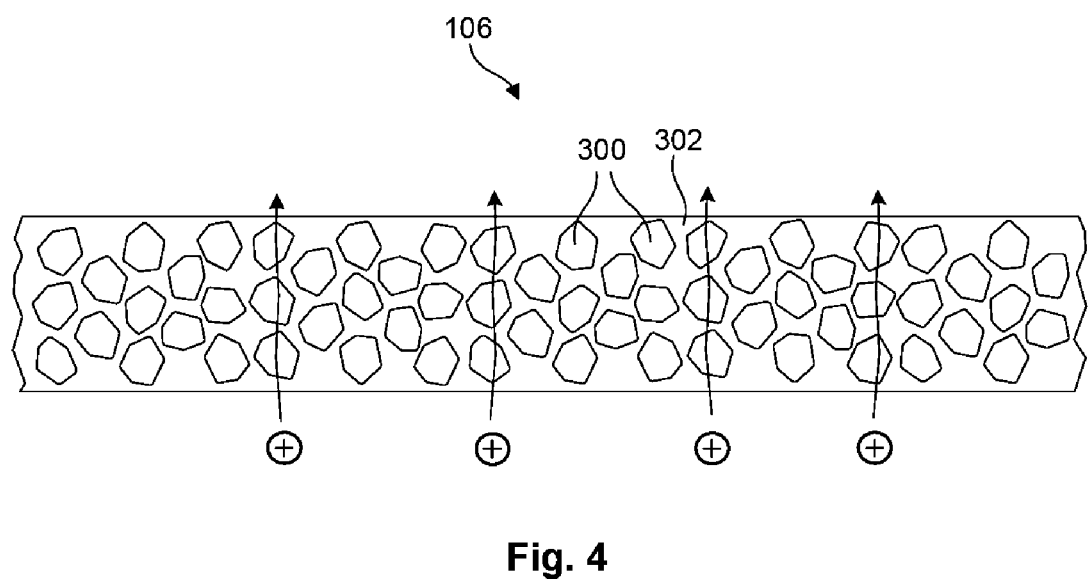
FIG. 4 is a cross-sectional cutaway view of another embodiment of a substantially solid-state electrolyte separator in accordance with the invention.

For example, referring to FIG. 4, when the weight ratio of the ionically conductive particles 300 relative to the first phase 302 is increased, the path length through the more conductive second phase 300 will be increased, while the path length through the less conductive first phase 302 will be decreased. This will improve the overall conductivity of the electrolyte separator 106 and reduce its resistance. When increasing the weight ratio of the ionically conductive particles 300 relative to the first phase 302, the ratio should not be increased beyond the point that it will detrimentally impair the separator's flexibility and shock resistance. Thus, a tradeoff of conductivity and resistance versus flexibility and shock resistance should be considered.

Figure 5:
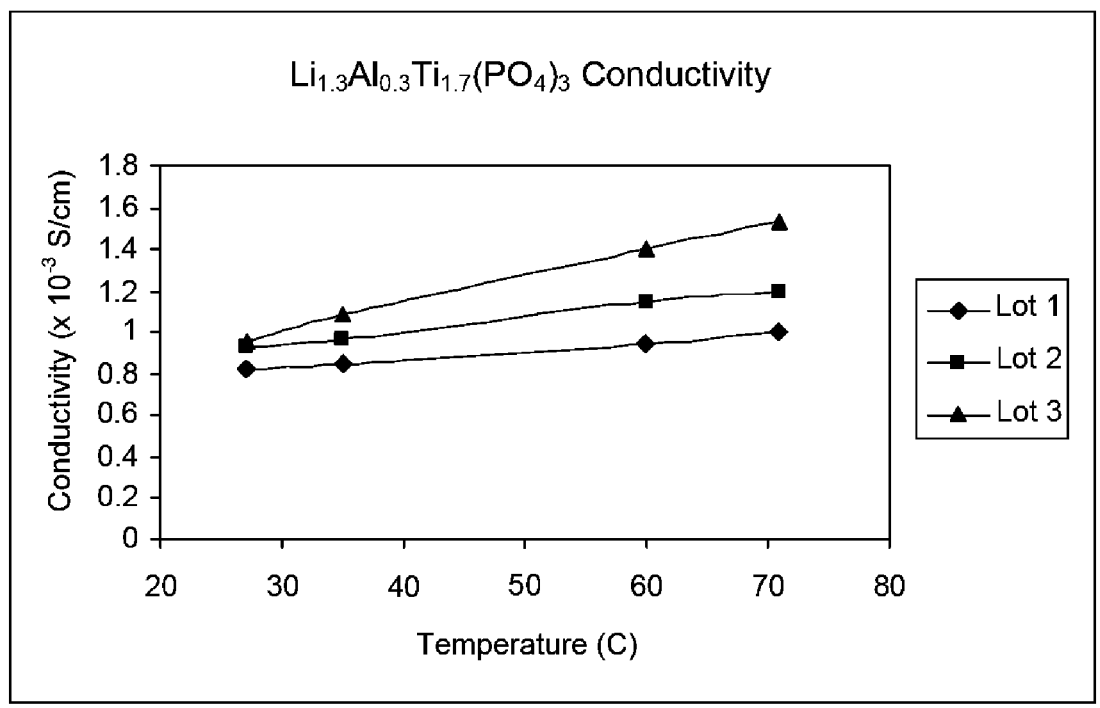
FIG. 5 is a graph showing the ionic conductivity of various formulations of lithium aluminum titanium phosphate (LATP).

Referring to FIG. 5, as previously mentioned, in selected embodiments, LATP is one type of ceramic that may be used in the second phase in the electrolyte separator 106. Applicants have synthesized and fabricated LATP and performed various tests on the resulting material. FIG. 5 shows the conductivity of the fabricated LATP versus temperature for various lots. As shown, the room temperature conductivity is relatively good for a solid conductor, nearly $10^{-3}$ S/cm. In addition, the Li$^+$ transference number is expected to be nearly 1. This conductivity is much higher than poly(ethylene oxide) combined with LiClO$_4$, which is reported to be around $10^{-7}$ S/cm at room temperature. The conductivity improves significantly to around $10^{-5}$ S/cm at about 60° C. when the crystallinity of the poly(ethylene oxide) decreases. LATP has good conductivity but by itself cannot be used as a separator 106 for lithium-ion batteries when fabricated thin because it is not flexible and has low strength.

In selected embodiments, LATP may be fabricated by taking raw materials such as oxides, nitrates and carbonates and milling them together. These materials may then be calcined in a vessel, such as an alumina vessel. Once calcined, the resulting material may be milled again to a fine particle size. The powder may be characterized using X-ray diffraction (XRD) to verify phase purity. Particle size and surface area may also be determined. A portion of the material may be formed into a pellet and sintered. The sintered sample may be used to determine optimal conductivity and Li$^+$ transference number as a characterization of the unsintered powder.

As also mentioned, in selected embodiments, the first phase may include poly(ethylene oxide) combined with LiClO$_4$. In selected embodiments, this material may be made by taking poly(ethylene oxide) with a molecular weight ($M_n$) in the range of 50,000 to 70,000 or near 300,000, and LiClO$_4$ and vacuum drying it. Acetonitrile may be used as a solvent for the slips after dissolving the poly(ethylene oxide). The molar ratio of the ethylene oxide to the LiClO$_4$ may be about 8:1.

Slips may be cast onto Teflon plates and allowed to dry for twenty-four hours under argon. The resulting material may then be vacuum dried for twelve hours at 65° C. to remove substantially all residue solvent. The conductivity of the sample may then be measured using electrochemical impedance spectroscopy (EIS) on film samples sandwiched between blocking electrodes. Li$^+$ transference number may then be measured using methods known in the art.

In selected embodiments, cathode materials may be prepared by combining 82 weight percentage carbon coated LiFePO$_4$, 5 weight percentage acetylene black (Denka), and 13 weight percentage of the electrolyte separator material. The cathode materials may be combined in acetonitrile with a homogenizer. Following homogenization, the cathode materials may be pasted to an aluminum current collector, dried, and pressed.

In selected embodiments, lithium sheet disks (i.e, the anode 102) may be punched to match the diameter of the cathode 104. The electrolyte separator 106 may be punched to have a diameter that is greater than the anode and cathode diameters. The electrolyte separator 106 may then be sandwiched between the lithium metal sheet and the cathode sheet. The cell assembly may then be sandwiched together using appropriate testing hardware. In selected embodiments, cells may be cycled between 2.5V and 4.0V at a C/8 rate at room temperature for at least 10 cycles and over 100 cycles if the cells remain stable. Capacity versus cycle number may then be measured. Charge and discharge voltage versus capacity may also be measured at various cycles.

EXAMPLE 1

An electrolyte separator 106 was fabricated that was thirty percent by weight poly(ethylene oxide)/LiClO4, and seventy percent by weight LATP. The molar ratio of poly(ethylene oxide) to LiClO4 was approximately 8:1. The molecular weight of the poly(ethylene oxide) was about 300,000. The separator constituents were mixed in acetonitrile and then cast onto Teflon. The slip was then dried overnight and vacuum dried at 60° C. overnight. The resulting separator 106 was 1000 microns thick and had an active area of 3.88 cm$^2$. An electrolyte solution comprising one molar LiClO4 in tetraglyme solvent was placed adjacent to both sides of the separator 106 and nickel electrodes were placed in contact with the electrolyte solution. The DC conductivity of the solution was measured to be 2 mS/cm. The AC impedance spectrum of the solution was recorded at 27° C. from 1 MHz to 1 Hz. The bulk conductivity of the separator 106 was measured to be 0.20 mS/cm and the interfacial conductivity was measured to be 0.025 mS/cm. The total conductivity was measured to be 0.022 mS/cm. This example shows that LATP particles (where the weight ratio of LATP to poly(ethylene oxide) is greater than 20:80) may significantly increase the conductivity of a poly(ethylene oxide)/LiClO4 solid electrolyte.

The present invention may be embodied in other specific forms without departing from its basic principles or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An alkali-metal-ion battery comprising:
   an anode containing an alkali metal;
   a cathode;
   an electrolyte separator for conducting alkali metal ions between the anode and the cathode, the electrolyte separator comprising the following:
      a first phase comprising poly(alkylene oxide) and an alkali-metal salt in a molar ratio of less than 10:1;
      a second phase comprising ionically conductive particles that are conductive to the alkali metal ions, wherein the ionically conductive particles are selected from the group consisting of ceramic particles, glass particles, and glass-ceramic particles, wherein the molar ratio of poly(alkylene oxide) to alkali-metal salt is independent of the amount of ionically conductive particles in the second phase.

2. The alkali-metal-ion battery of claim 1, wherein the electrolyte separator further comprises a third phase comprising porous particles infiltrated with an organic solvent.

3. The alkali-metal-ion battery of claim 1, wherein the alkali metal is one of lithium and sodium and the alkali metal ions are one of lithium ions and sodium ions.

4. The alkali-metal-ion battery of claim 1, wherein the poly(alkylene oxide) is selected from the group consisting of poly(ethylene oxide), poly(propylene oxide), and copolymers of ethylene oxide and propylene oxide.

5. The alkali-metal-ion battery of claim 1, wherein the alkali-metal salt is one of a lithium salt and a sodium salt.

6. The alkali-metal-ion battery of claim 5, wherein the lithium salt is lithium perchlorate.

7. The alkali-metal-ion battery of claim 1, wherein the molar ratio is about 8:1.

8. The alkali-metal-ion battery of claim 1, wherein the ionically conductive particles are ceramic particles.

9. The alkali-metal-ion battery of claim 8, wherein the ceramic particles are particles of lithium aluminum titanium phosphate (LATP).

10. The alkali-metal-ion battery of claim 1, wherein the weight ratio of ionically conductive particles to poly(alkylene oxide) exceeds 20:80.

11. The alkali-metal-ion battery of claim 1, wherein the weight ratio of ionically conductive particles to poly(alkylene oxide) exceeds 50:50.

12. The alkali-metal-ion battery of claim 2, wherein the organic solvent comprises a solvent selected from the group consisting of ethylene carbonate, propylene carbonate, diethyl carbonate, tetraglyme, and mixtures thereof.

13. The alkali-metal-ion battery of claim 12, wherein an alkali-metal salt is dissolved in the organic solvent.

14. An alkali-metal-ion battery comprising:
   an anode containing an alkali metal;
   a cathode;
   an electrolyte separator for conducting alkali metal ions between the anode and the cathode, the electrolyte separator comprising the following:
      a first phase comprising poly(ethylene oxide) and an alkali-metal salt in a molar ratio of about 8:1;
      a second phase comprising ionically conductive particles that are conductive to the alkali metal ions, wherein the ionically conductive particles are selected from the group consisting of ceramic particles, glass particles, and glass-ceramic particles, wherein the molar ratio of poly(alkylene oxide) to alkali-metal salt is independent of the amount of ionically conductive particles in the second phase; and
      a third phase comprising porous particles infiltrated with an organic solvent and an alkali-metal salt.

* * * * *